United States Patent [19]
Cox et al.

[11] 3,832,107
[45] Aug. 27, 1974

[54] APPARATUS FOR MAKING ARTICLES FROM PARTICULATE MATTER

[75] Inventors: Arthur R. Cox, Jupiter; Paul R. Holiday, Juno Beach, both of Fla.

[73] Assignee: United Aircraft Corporation, East Hartford, Conn.

[22] Filed: June 29, 1973

[21] Appl. No.: 375,306

[52] U.S. Cl. .................... 425/78, 425/73, 425/258, 425/405
[51] Int. Cl. ........................................... B30b 11/02
[58] Field of Search .... 425/73, 78, 256, 258, 409 R

[56] References Cited
UNITED STATES PATENTS
3,343,209  9/1967  Solomir et al. .................. 425/78
3,521,326  7/1970  Rice et al. ........................ 425/78

*Primary Examiner*—J. Howard Flint, Jr.
*Attorney, Agent, or Firm*—Jack N. McCarthy

[57] ABSTRACT

An apparatus for receiving particulate matter of metal and producing a compact article therefrom. While the formation of a billet is shown, a contoured article could be produced if the proper configuration was formed on mating die faces. Particulate material is received in a hopper where it can be treated by gasses to aid in removing bulk water. To remove any gasses which would react with the material in an undesirable way, means are provided to place the hopper and transfer means under a vacuum for outgassing. Means are provided to transfer the metal particulate to a press means, at a controlled rate, while placing the particulate matter at the desired pressure and proper temperature. The press means also includes means for receiving a container. The container will encase the billet after the particulate matter has been compacted. Means are provided to remove the completed billet after a top has been placed on the container and sealed. This sealing can be done by welding the top, or cap, thereon under vacuum condition.

17 Claims, 3 Drawing Figures

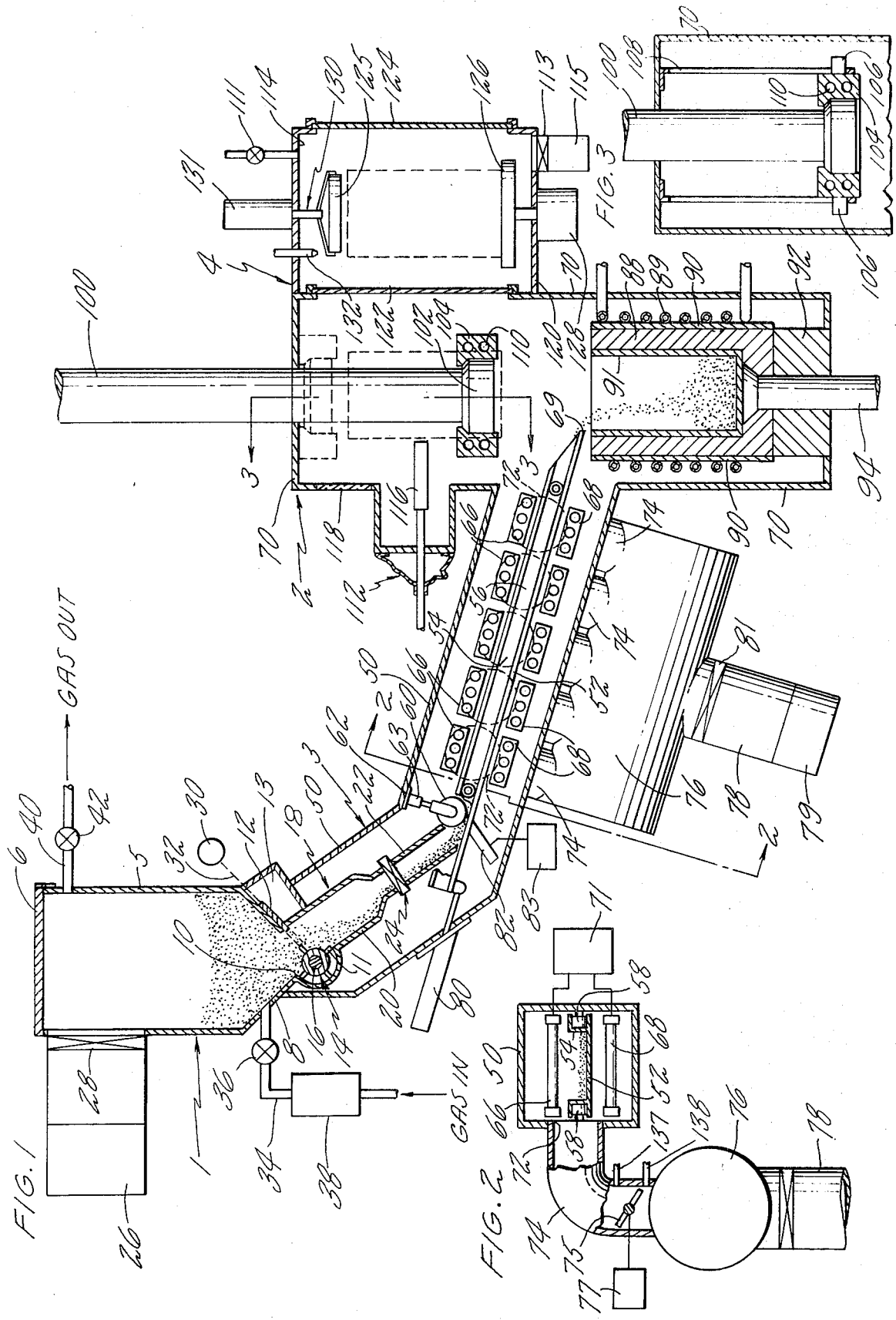

APPARATUS FOR MAKING ARTICLES FROM PARTICULATE MATTER

BACKGROUND OF THE INVENTION

The present invention relates to an apparatus for making billet stock or other useful articles by the consolidation of particulate material. It is believed here that the use of the cold-worked particulate material provides an advance over powder metallurgy. See U.S. Pat. application Ser. No. 367,601 filed June 6, 1973 entitled Production of Homogeneous Alloy Articles to Arthur R. Cox and Gary K. Lewis.

SUMMARY OF THE INVENTION

An object of this present invention is to provide an apparatus for making compacted articles from particulate matter.

In accordance with the invention an apparatus is set forth for receiving particulate matter and treating it to remove any bulk water and undesirable gasses therefrom, transfer means being provided to transfer said matter to a press means whereby the matter has already been heated, and outgassed, the press means contains a heated container for receiving the particulate matter while a ram having a heated head is positioned to compact the particulate matter during the formation of the billet, means are provided for removing the container and compacted particulate matter from the press means to a location where a top is placed on the container and fixedly sealed thereto while under a vacuum, means being provided to remove the finished billet and top to atmosphere without losing the desired heat and pressure conditions around the press means and transfer means.

A further object of this invention is to provide a hopper for receiving particulate matter, said hopper having means for continually feeding said matter from said hopper. Said hopper having an inlet for feeding dry air, nitrogen or other inert gas over said particulate matter and an exhaust outlet to remove any undesirable water, valve means being provided for opening and closing the inlet and outlet. Vacuum means for forming a vacuum in the hopper to provide for outgassing.

Another object of this invention is to provide an apparatus for achieving a desired homogeneous temperature and pressure of the particulate in a contained charge before compaction.

A further object of the invention is to provide a transfer means for moving the particulate matter from said hopper to a heated container in a press means. Said means involving a conveyor set an an angle, having the particulate matter placed at its high end from said hopper and having its low end directed into a container. Means being provided to actuate said conveyor to move said matter from the upper end of the conveyor to the lower end at a desired rate.

Another object of this invention is to heat the particulate matter being moved along the conveyor means. An exit opening is provided at five points along the side of said conveyor so that the particulate matter can be outgassed as it is heated along its path towards the container of the press means.

A further object of the invention is to provide the proper thermal and pressure gradients along the length of the conveyor means, whereby adsorbed species on the particulate matter may be desorbed and gassified through the combined action of the heating means and the vacuum means, together with its associated vacuum ports or openings, flow control valves, conduits and manifolds, in such a manner that the gaseous species formed at any particular location along the length of the conveyor means do not react in a deleterious fashion with particulate matter at any other location along the length of the conveyor means, whereby the desorption process would lose its effectivity.

Another object of this invention is to provide vacuum type pressure monitoring gages on the upstream and downstream sides, adjacent to and equidistant from each of the vacuum flow control valves. These gages are used to provide information, such as mass flow rate through each of the five vacuum ports adjacent to the conveyor means, to insure that the desorbed gas flow is such, so as to preclude the occurrence of the aforementioned deleterious gas-solid interactions.

A further object of the invention provides a press means having a die with a large cylindrical opening located at the center thereof for receiving a container. Said heated particulate matter being directed from the end of said conveyor means into said container. Said container being heated by heating means therearound.

Another object of the invention is to provide means for fixing a top on the container when it has been substantially filled with compacted particulate matter.

BRIEF DESCRIPTION OF THE DRAWING

FIG. 1 is a schematic view of the apparatus for making articles from particulate matter of metal, FIG. 2 is a view taken long the line 2-2 of FIG. 1, and FIG. 3 is a view taken along the line 3-3 of FIG. 1.

DESCRIPTION OF THE PREFERRED EMBODIMENT

An apparatus for making an article from particulate matter of metal.

As set forth in FIG. 1, the apparatus comprises four main parts, (1) handling means 1 for receiving and distributing particulate matter of metal; (2) press means 2 for compacting said particulate matter of metal; (3) transfer, heating and outgassing means 3 for transferring said particulate matter of metal from said handling means 1 to said press means 2 while acting on said particulate matter of metal; (4) removal means 4 for removing said compacted particulate matter of metal for further use.

Said handling means 1 for receiving and acting on particulate matter of metal including a hopper 5. Said hopper 5 has a top cover 6 which is sealed therewith when closed, providing for a vacuum type seal. The lower part of said hopper 5 is formed as a funnel section 8 with an elongated opening 10 at the bottom thereof. A sliding valve door 12 is located on one side of the funnel section 8 to control the size of the opening 10. The sliding valve door 12 extends into a sealed chamber 13 so as to maintain a sealed housing. The actuating means 30 for the valve door 12 and actuating linkage 32 can be placed within the chamber 13 with a remote type actuation or can be mounted externally of the apparatus with a vacuum seal being maintained around any portion extending through the walled housing. A rotary feed mechanism 14 is located adjacent the opening 10 to further control the flow of particulate matter from the hopper 5. An electric motor is connected to the drive shaft 16 to control rate of turning of the rotary feed mechanism 14. The rotary feed mechanism 14 has paddles 11 for aiding in the control of flow of the metal particulate.

Particulate matter from the opening 10 and feed mechanism 14 discharges into a closed chute 18 having an upper section 20 fixed with respect to the hopper and a lower section 22 positioned to direct the matter onto or into a conveyor means 52. Said closed chute 18 has a valve means 24 located therein to provide for a vacuum seal. A vacuum forming means 26 is connected to the hopper 5 by a valve 28 for providing and maintaining a vacuum in the hopper 5 and cooperating areas when desired.

A supply of gas (not shown) is provided to aid in removing bulk water and other undesirable species from the particulate matter in the hopper 5, this gas is connected to the bottom of the hopper 5 by a conduit 34 having on-off valve 36; a heater 38 is provided to arrive at the proper gas temperature for the particulate matter being used. To permit the gas to flow through and around the particulate matter, an exit conduit 40 is provided having an on-off valve 42. This valve can also be used to relieve hopper 5 when it is under a vacuum. The gas fed into the hopper 5 for outgassing can be dry air, nitrogen or any inert gas. Air could be fed through at approximately 200°F. and nitrogen at about 400°F. The gas heater 38 can have controls for heating the gas to any desired temperature.

The transfer, heating, and outgassing means 3 for transferring said particulate matter of metal from said handling means 1 to said press 2 while acting on said particulate matter of metal includes a housing 50 which is connected to said hopper 5 and to a housing 70 of the press means 2. Said transfer means 3 includes a conveyor means 52 for moving said particulate matter of metal through the housing 50 from the exit of the lower section 22 of the closed chute 18, into the housing 70 and to the press means 2 for a purpose to be hereinafter described. The conveyor means 52 is formed as a tray having sides 54 thereon to contain the particulate matter of metal with tracks 56 formed on each side thereof to ride on guide wheels 58 fixed to each side of the housing 50 for a purpose to be hereinafter described. While the conveyor means 52 is shown as a tray, it could be a movable belt or other conveyance device.

The lower section 22 of the chute 18 has a width at its exit which is slightly less than the width of the tray of the conveyor means 52 between the sides 54 so that it will fit therebetween, the metal particulate is deposited on the conveyor means 52 adjacent its upper end. A spreading roller 60 is connected to the inner side of the housing 50 at 62 and positioned just downstream of the exit. It is biased toward the tray by a spring in housing 63, leaving a small gap. This roller 60 tends to spread the particulate matter at the beginning of the conveyor means 62 so that the particulate matter will pass down the conveyor means 52 as evenly as possible.

Five heating units 66 are provided on the upper side of the conveyor means 52 and five heating units 68 are provided on the lower side of the conveyor means 52 for heating the particulate matter passing down said conveyor. Control means are provided to heat any combination of the individual heating units 66 or 68 desired. Two examples are, (1) all 10 heating units 66 and 68 can be heated to the same temperature to provide equal heating throughout the length of the conveyor means 52, or (2) each pair of heating units 66 and 68 located one over the other, can be heated from a low temperature at the upstream end of the conveyor means 52 to a high temperature at the exit end of the conveyor means 52. Heating units 66 and 68 are mounted in the housing 50 by conventional mounting means with controls extending to a control 71 on the exterior of the housing. In an apparatus constructed the heating units had resistance elements.

An opening 72 is formed in the side of the housing 50 adjacent the area between each pair of upper and lower heating units 66 and 68. This means that five openings are provided. These openings are each connected by a conduit 74 containing a flow control valve 75 and valve control means 77 to a larger manifold 76 which is in turn connected by conduit 78 to vacuum producing means 79. Relief valve means are provided to equalize the pressure in the housing 50 and 70 with the pressure externally thereof.

Adjacent to and equidistant from each of the vacuum flow control valves 75, is a pair of vacuum type pressure monitoring gages, upstream gage 137 and downstream gage 138.

Actuation means 80 are provided to move the conveyor means 52 between its transferring position, which is shown in FIG. 1, to a withdrawn position where it is moved to the left in FIG. 1 so that the exit end 69 is placed in a position where it will not interfere with the press means 2. This actuation means 80 can be any conventional unit providing translation such as a cylinder and piston unit, or rank and pinion unit. A vibration means 82 is connected to the bottom of the conveyor means 52 so as to vibrate it when the particulate matter of metal is being placed thereon for transfer to the press means 2. The vibration means control 83, is located externally of the housing 50 with a connection extending therethrough to the vibration means 82. This vibration means 82 can consist of a single vibrator located at one location or a plurality of vibrators located at different positions to achieve the desired rate of travel along the conveyor means 52. Further, the angle of the conveyor means 52 can also be positioned at various degrees to aid in achieving the desired traverse rate. As a matter of fact, other specific feed means can be used to carry the particulate matter of metal from the hopper 5 to the press means 2.

Press means 2 for compacting the particulate matter of metal includes the housing 70, mentioned hereinbefore, which is connected to the housing 50 of the transfer and heating means 3, the free end 69 of the conveyor means 52 being movable into and out of the housing 70 to the degree necessary so as not to interfere with the moving parts of the press means 2.

A container restraint means 88 is fixedly positioned in housing 70 for receiving and supporting a container 91 for the particulate matter of metal as it passes from the free end 69 of the conveyor means 52 when the conveyor means 52 is in position for transferring the particulate matter to the container. The container restraint means 88 is positioned on a bed 92. Knock-out pin means 94 is positioned in the bottom of the container restraint means 88 and through the bed 92 for actuation from below the press means 2. The actuating means can be a hydraulic ram or other mechanical means to move the knock-out pin in an axial direction.

The container restraint means 88 in one construction built was comprised of a thick molybdenum container which acts as a susceptor; other suitable materials can be used. Heating coils 89 are provided around the container 88 to pre-heat the container 91 and to maintain heat in the particulate matter placed in the container 91. Insulation can be provided around the hopper 5, housing 50 and housing 70 if necessary. In a construction built, copper induction heating coils were used with a coolant flow therethrough and an insulation layer 90 was placed around the molybdenum container 88.

A ram 100 is positioned above and aligned with container restraint means 88 and has a ram head 102 which has a close fit with the container 91. The ram is movable axially to compress the metal particulate in the container 91 whenever desired when the conveyor means 52 has been moved to the left so as not to interfere. Any ram actuator can be used having the desired force. A ram heater 104 is located in an upper portion of the housing 70 and is movable with the ram head 102 for the greater portion of its stroke; from the top of housing 70 to a position just above the container restraint means 88. At this point, it is stopped against further downward movement. The ram heater 104 has lugs 106 on each side which are guided in an axial cam slot 108. The lugs 106 have flat sides engaging the sides of the cam slots 108 to prevent pivotal movement. The heating coil 110 has inlet and outlet connection which extend through the housing 70 to an external control.

Handling means 112 are provided for grabbing an article formed in said container restraint means 88 after it has been removed by said knock-out pin means 94, to plate it in another chamber 114. The handling means 112 can be one of a number of well-known devices. These can consist of a member either mounted within a housing 70 with remote controls being used or by a pincher type head 116 controlled by a rod and other control means therein passing through an opening in the housing 70 which is sealed to prevent loss of desired conditions within the housing 70. A glass window 118 is provided so that the operation of the handling means 112 can be facilitated.

Chamber 114 is formed in a housing 120 which is attached to one side of housing 70. A sliding door 122 is located between chamber 114 and housing 70, and a sliding door 124 is located in another side of the housing 120 to provide access to the chamber 114. Each of the doors 122 and 124 are formed to have a sealing contact with their respective housing when closed, said seal being of the type to maintain a vacuum.

A vacuum forming means 115 is connected to the chamber 114 by a valve 113 for providing and maintaining a vacuum therein. Relief valve means 111 are provided to equalize the pressure in the chamber 114 with the pressure externally thereof.

Chamber 114 has a turntable 126 located at the bottom thereof with control means 128 for rotating the table. Means are provided at the top of the chamber for placing a top 125 on a container 91 in which particulate has been compressed, and means are also provided to weld said top 125 on said container 91 to maintain vacuum environment. The means for placing the top 125 on the container 91 can consist of a simple handling means 130 which can be controlled externally at 131 to align the top 125 and position it for welding.

The handling means 130 can be one of a number of well-known devices. A welding device 132 is located in chamber 114 and can be operated from an external position to perform a welding operation. The welding device 132 is positioned adjacent the edge of the top and container for welding them together; the container can be rotated by the control 128.

An additional vacuum forming means can be provided on housing 70 if necessary.

OPERATION

In operation the rotary feed mechanism 14 would be placed so that a paddle would contact the adjacent edge of sliding valve door 12 to prevent a flow of matter from the hopper. The hopper would then be filled to the desired height with the particulate matter of metal. The valve 24 would be placed in its closed position, with the top cover 6 closed and sealed, and with valve 28 closed. Valves 36 and 42 would be placed in an open position so that the particulate matter could have a gas pass thereover to aid in removing bulk water and other undesirable contaminates. The heat of this gas can be controlled by the heater 38. The temperature will vary depending on the matter being used and the type of gas being used. When it has been determined that a sufficient amount of gas has passed over the particulate matter, the valve 36 is closed along with valve 42. The vacuum forming means 26 is then turned on and the valve 28 opened to outgas and arrive at a desired vacuum condition.

Doors 122 and 124 are opened and a container 91 is placed in the container restraint means and susceptor 88 in position to receive particulate matter. This can be done by using the handling means 112 and knock-out pin means 94. A top, or cap, 125 is placed in the chamber 114 in a position where it is held by the handling means 130. The door 124 is then closed. The vacuum producing means 79 and 115 are turned on to arrive at a vacuum condition of approximately $10^{-4}$ TORR in housing 50, housing 70, and chamber 114. The heating units 66 and 68 are then turned on to achieve the desired heating effect on particulate matter passing down the conveyor means 52. The heating coils 89 and 110 located around the container restraint means and susceptor 88 and ram head 102, respectively, are turned on to provide the proper heating for use in compacting the heated particulate which is deposited in the container 91. Heating coil 89 could be made to keep the particulate matter in the container at the desired temperature leaving the conveyor means. The conveyor means 52 is extended so that the particulate will drop from the end 69 right into the container 91 so that there is a minimum of heat loss.

The valve 24 is then opened and the rotary feed mechanism 14 is started to initiate flow of particulate matter down the chute 18 to the conveyor means 52 just upstream of the roller 60. The vibration means control 82 is positioned to start the vibration means 82 to achieve the desired traverse rate of particulate matter along conveyor means 52. Flow control valves 75 are adjusted by means of valve control 77, to remove the gaseous products of the desorption process taking place in housing 50 in such a manner that said reaction products do not react with particulate matter at any other location along conveyor 52. Information to determine the optimum setting of flow control valves 75, is provided by upstream pressure gages 137 and downstream pressure gages 138 which indicate gas flow thereby. The flow control valves 75 are positioned so that the upstream pressure gages 137 in each of the five conduits 74 connected to the openings 72 indicate an increasing pressure gradient along the direction of travel of conveyor means 52. If an upstream pressure reading becomes greater than a downstream reading, the flow control valves 75 are repositioned to reachieve an increasing pressure gradient as set forth above. This procedure continues until the container 91 becomes filled with particulate matter to the point where it is desired to compact them.

The rotary feed mechanism 14 and sliding valve door 12 are moved to provide flow of particulate matter from hopper 5. The conveyor means 52 is then withdrawn so the end 69 does not interfere with the press action. The ram 100 is then moved downwardly, with the ram head 102 leaving the ram heater 104 and being positioned at the opening of the container 91 where it slides into the container until it contacts the particulate matter. The ram then compresses or compacts this matter to provide room for more of the loose particulate matter. The ram 100 is withdrawn and the conveyor extended to its operative position and the apparatus again placed into operation with the particulate matter being fed into the container 91. When the particulate matter again approaches the top of the container 91, the ram operation is repeated to provide more room for loose particulate matter. This procedure is repeated until the desired amount of particulate matter is placed within the container 91 and compressed to the degree desired. In producing a billet, a desired density is that which will allow subsequent heating by thermal conduction. When this has been done, the ram 100 is withdrawn to its top position with the ram head 102 and heater 104 adjacent the top of the housing 70. The knock-out pin means 94 then lifts the compacted particulate matter and container 91 out of the container restraint means and susceptor 88 to a position in the upper part of housing 70 where it can be handled by the handling means 112. The handling means grabs the article by the pincher type head 116 and after door 122 has been opened, the operator places the article on the turntable 126 in chamber 114.

The top, or cap, 125 is placed in the top of the container 91 on top of the compacted particulate matter and then the handling means 130 is retracted to an out-of-the-way position. The welding means 132 is then positioned adjacent the edge of the top 125 and container 91 for welding them together. The container is rotated on its turntable 126 by the control 128 to achieve a 360° weld. After the sliding door 122 has been closed, the interior of the chamber 114 has its pressure equalized to that of the atmosphere through valve 111 and the sliding door 124 is then opened to provide access to the finished article.

We claim:

1. An apparatus for making an article from particulate matter comprising:
  a. hopper means for receiving particulate matter,
  b. press means for compacting said particulate matter,
  c. transfer means for transferring said particulate matter from said hopper means for receiving said particulate matter to said press means,
  d. said hopper means being capable of being placed under a vacuum,
  e. housing means enclosing said press means and transfer means,
  f. means for forming a vacuum in said hopper means and in said housing means.

2. An apparatus for making an article from particulate matter as set forth in claim 1 wherein:
  g. said transfer means includes a conveyor for moving said particulate at a controlled rate through the vacuum in said housing.

3. An apparatus for making an article from particulate matter as set forth in claim 2 including:
  h. means for heating said particulate matter as the particulate matter moves towards said press means.

4. An apparatus for making an article from particulate matter as set forth in claim 1 wherein:
  g. said press means includes a container restraint means for holding a container for receiving particulate matter from said transfer means,
  h. said press means including a ram positioned over said container restraint means for extending thereinto.

5. An apparatus for making an article from particulate matter as set forth in claim 4 wherein:
  i. said press means includes means for heating said particulate matter in said container restraint means.

6. An apparatus for making an article from particulate matter as set forth in claim 4 wherein:
  i. said ram has means for heating said ram.

7. An apparatus for making an article from particulate matter as set forth in claim 4 including:
  i. a container is positioned in said container restraint means,
  j. means for removing the compacted particulate matter and container from said container restraint means,
  k. means for placing a top on said container,
  l. means for fixing said top on said container thereby sealing the compacted particulate matter therein.

8. An apparatus for making an article from particulate matter as set forth in claim 3 including:
  i. opening means adjacent said conveyor for drawing off any gasses released from said particulate matter to prevent said gasses from being carried through to said press means.

9. An apparatus for making an article from particulate matter as set forth in claim 8 including:
  j. said opening means being connected by a duct to a means for forming a vacuum,
  k. said opening means being located adjacent the upstream end of said conveyor.

10. An apparatus for making an article from particulate matter as set forth in claim 8 including:
  j. said opening means comprising a plurality of openings along the length of said conveyor,
  k. each opening being connected by a duct to a means for forming a vacuum.

11. An apparatus for making an article from particulate matter as set forth in claim 10 including:
  l. each of said ducts having a flow control valve therein,
  m. said flow control valves being positioned to place an increasing pressure gradient in said transfer means along the direction of travel of the conveyor.

12. An apparatus for making an article from particulate matter as set forth in claim 11 including:
   n. each of said ducts having a pressure gage upstream of each flow control valve to detect the pressure therein.

13. An apparatus for making an article from particulate matter as set forth in claim 1 wherein:
   g. said hopper means includes an inlet and outlet means for passing gas over particulate matter therein.

14. An apparatus for making an article from particulate matter as set forth in claim 3 including:
   i. said means for heating comprising a plurality of heaters for varying the heat distribution along the length of the conveyor.

15. An apparatus for making an article from particulate matter as set forth in claim 2 including:
   h. means for moving said conveyor between a position where it directs particulate matter to said press means and a position where it is withdrawn from the press means to permit actuation thereof.

16. An apparatus for making an article from particulate matter as set forth in claim 1 including:
   g. first heating means positioned adjacent said transfer means for heating said particulate matter being transferred by said transfer means,
   h. said press means including container restraint means for holding a container for receiving particulate matter from said transfer means,
   i. second heating means located adjacent said container restraint means for heating a container,
   j. said transfer means being positioned for dropping heated particulate matter thereon into a container in said container restraint means,
   k. said first heating means and said second heating means placing said particulate matter at a substantially homogeneous desired temperature in a container and maintaining said temperature for compaction.

17. An apparatus for making an article from particulate matter as set forth in claim 3 wherein:
   i. said press means includes means for heating said particulate matter in said container restraint means,
   j. said heating means and vacuum achieving a desired homogeneous temperature and pressure of particulate matter in a contained charge compaction by said press means.

* * * * *